(12) United States Patent
Matsumoto et al.

(10) Patent No.: US 7,307,231 B2
(45) Date of Patent: Dec. 11, 2007

(54) TOUCH PANEL, METHOD OF MANUFACTURING THE SAME, AND INPUT DEVICE USING THE SAME

(75) Inventors: Kenichi Matsumoto, Osaka (JP); Yasutaka Yamamoto, Osaka (JP); Koji Tanabe, Osaka (JP); Yoshiharu Abe, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 75 days.

(21) Appl. No.: 11/557,593

(22) Filed: Nov. 8, 2006

(65) Prior Publication Data
US 2007/0108032 A1    May 17, 2007

(30) Foreign Application Priority Data

| Nov. 16, 2005 | (JP) | ............................. 2005-331062 |
| Nov. 21, 2005 | (JP) | ............................. 2005-335487 |
| Jul. 25, 2006 | (JP) | ............................. 2006-201566 |

(51) Int. Cl.
*H01H 1/10*    (2006.01)

(52) U.S. Cl. ........................ 200/512; 200/600; 345/173

(58) Field of Classification Search ........ 200/511–514, 200/600, 265–270; 345/173–714
See application file for complete search history.

(56) References Cited

U.S. PATENT DOCUMENTS

| 6,380,497 B1* | 4/2002 | Hashimoto et al. ......... 200/5 A |
| 6,639,163 B2* | 10/2003 | Fukui et al. ................. 200/512 |
| 6,777,631 B2* | 8/2004 | Muraoka et al. ............ 200/268 |
| 2002/0100677 A1* | 8/2002 | Fukui et al. ................. 200/512 |
| 2004/0069605 A1* | 4/2004 | Takabatake et al. ..... 200/61.01 |

FOREIGN PATENT DOCUMENTS

| JP | 06-309101 | 11/1994 |
| JP | 2005-274667 | 10/2005 |

* cited by examiner

*Primary Examiner*—R. Lee
(74) *Attorney, Agent, or Firm*—RatnerPrestia

(57) ABSTRACT

A touch panel includes a first substrate, a first resistance layer on a surface of the first substrate, a second substrate, a second resistance layer on a surface of the second substrate, a spacer having substantially a frame shape provided between outer peripheries of the first and second substrates, a sheet having a surface attached to the surface of the second substrate with a first adhesive layer, and a second adhesive layer on the surface of the sheet. The second resistance layer faces the first resistance layer by a predetermined gap between the second and first resistance layers. The second adhesive layer has an adhesion property weaker than that of the first adhesive layer. This touch panel can be attached onto a display element again easily.

14 Claims, 11 Drawing Sheets

TOUCH PANEL, METHOD OF MANUFACTURING THE SAME, AND INPUT DEVICE USING THE SAME

FIELD OF THE INVENTION

The present invention relates to a touch panel to be used for operating various electronic devices, to a method of manufacturing the touch panel, and to an input device including the touch panel.

BACKGROUND OF THE INVENTION

As various electronic devices, such as cellular phones and car-navigation systems, have been having sophisticated functions, an input device including a light-transmittable touch panel mounted onto a front surface of a display element, such as a liquid crystal display (LCD), have been used. While looking at a display on the display element behind the touch panel, an operator pushes the touch panel with a finger or a pen for switching various functions of the electronic devices. The touch panel is required to have an excellent visibility and be inexpensive.

FIG. 11 is a sectional view of conventional touch panel 5001 disclosed in Japanese Patent Laid-Open Publication No.2005-274667. This drawing is enlarged in its thickness direction in order to illustrate its structure more understandable. Touch panel 5001 includes substrate 1 which has a film shape and is light-transmittable, substrate 2 which is light-transmittable, upper resistance layer 3 made of light-transmittable resistor, such as indium tin oxide (ITO), placed on a lower surface of substrate 1, and lower resistance layer 4 made of light-transmittable resistor, such as ITO, placed on an upper surface of substrate 2. Plural dot-spacers made of insulating resin are provided at predetermined intervals on an upper surface of lower resistance layer 4. Pair of upper electrodes are formed at both ends of upper resistance layer 3, respectively. A pair of lower electrodes are formed at both ends of lower resistance layer 4 which are arranged in a direction perpendicular to the direction in which the upper electrodes. Spacer 5 having substantially a frame shape is adhered onto respective outer peripheries of substrates 1 and 2 with adhesive layers provided on upper and lower surfaces of spacer 5, so that upper resistance layer 3 faces lower resistance layer 4 by a predetermined gap between the surfaces.

Adhesive layers 7A and 7B are provided on upper and lower surfaces of sheet 6, respectively. Adhesive layer 7A is bonded to a lower surface of substrate 2, and removable paper 8 is attached onto adhesive layer 7B.

Removable paper 8 is peeled off from touch panel 5001, and then adhesive layer 7B is bonded to a front surface of a display element, such as a liquid crystal display (LCD), thus providing touch panel 5001 mounted onto the electronic device. The upper electrodes and the lower electrodes are connected to an electronic circuit of the electronic device.

While looking at a display on the display element through touch panel 5001, an operator pushes an upper surface of substrate 1 with a finger or a pen. Substrate 1 accordingly sags and causes upper resistance layer 3 to contact lower resistance layer 4 at a pushed portion of the substrate. The electronic circuit applies a voltage to the upper electrode, and detects, via the lower electrode, a voltage corresponding to the pushed portion of the upper electrode. Then, the circuit applies a voltage to the lower electrode and detects, via the upper electrode, a voltage corresponding to the pushed portion. The electronic device calculates the pushed portion based on the detected voltages, then switching various functions of the electronic device.

A method of manufacturing touch panel 5001 will be described below. FIGS. 12A to 12C are sectional views of touch panel 5001 for illustrating the method of manufacturing the touch panel. As shown in FIG. 12A, substrate 1 and substrate 2 are bonded to spacer 5. Then, sheet 6 is attached onto the lower surface of substrate 2 with roller 9, as shown in FIG. 12B. Roller presses the left side of substrate 2 to cause the left side of substrate 2 to sag upward and to compress air between substrates 1 and 2, accordingly causing the right side of substrate 2 to expand downward and producing swell 2C. As a result, as shown in FIG. 12C, sheet 6 is attached onto substrate 2 while air bubble 2D is produced between substrates 1 and 2. Upon being attached onto the display element with sheet 6, touch panel 5001 causes air bubble 2D to prevent the operator hard from looking at the display element.

In order to avoid the production of air bubble 2D, the pressure applied by roller 9 to sheet 6 is precisely adjusted, or roller 9 is moved slowly so as not to produce swell 2C, thus increasing labor and time to manufacture the panel.

Touch panel 5001 may be attached onto the display element with misalignments due to a positional deviation. In order to be removed from and again attached onto the display element, in the case that touch panel 5001 is removed at adhesive layer 7A from the display element, sheet 6 which remains and is attached onto the display element is necessarily peeled off again. In the case that panel 5001 is removed at adhesive layer 7B from the display element, layer 7B which remains and is attached onto the display element is necessarily peeled off. Thus, both the cases require a certain work and time for mounting panel 5001 onto the display element again.

SUMMARY OF THE INVENTION

A touch panel includes a first substrate, a first resistance layer on a surface of the first substrate, a second substrate, a second resistance layer on a surface of the second substrate, a spacer having substantially a frame shape provided between outer peripheries of the first and second substrates, a sheet having a surface attached to the surface of the second substrate with a first adhesive layer, and a second adhesive layer on the surface of the sheet. The second resistance layer faces the first resistance layer by a predetermined gap between the second and first resistance layers. The second adhesive layer has an adhesion property weaker than that of the first adhesive layer.

This touch panel can be attached onto a display element again easily.

BRIEF DESCRIPTIONS OF THE DRAWINGS

DESCRIPTION OF THE PREFERRED EMBODIMENTS

Exemplary Embodiment 1

Figure 1A:
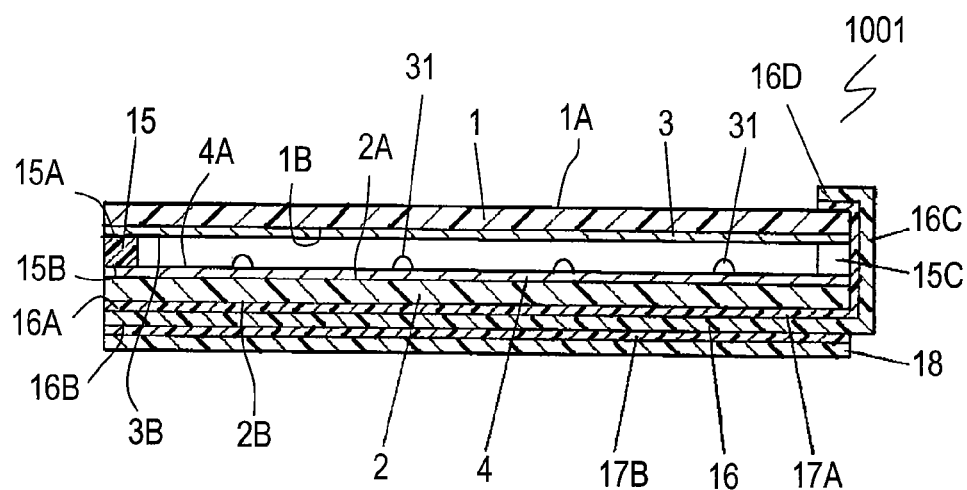
FIG. 1A is a sectional view of a touch panel in accordance with Exemplary Embodiment 1 of the present invention.
Figure 1B:
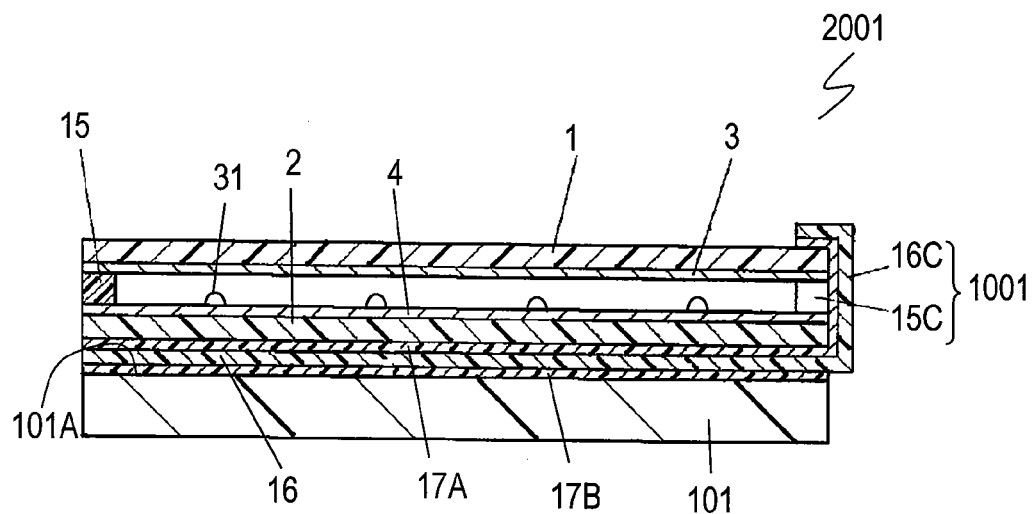
FIG. 1B is a sectional view of an input device in accordance with Embodiment 1.
Figure 2:
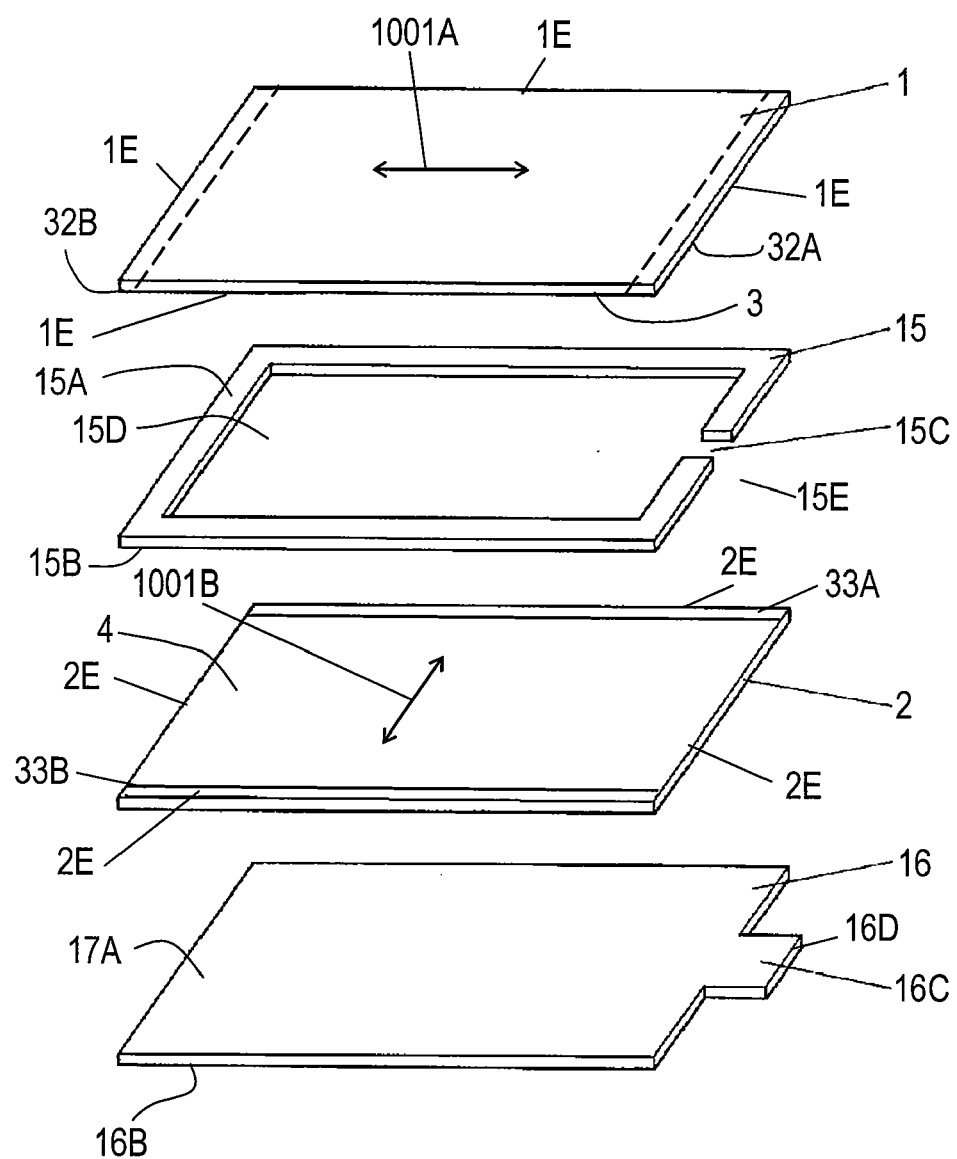
FIG. 2 is an exploded perspective view of the touch panel in accordance with Embodiment 1.

FIG. 1A is a sectional view of touch panel 1001 in accordance with Exemplary Embodiment 1 of the present invention. FIG. 1B is a sectional view of input device 2001 in accordance with Embodiment 1. FIG. 2 is an exploded perspective view of touch panel 1001. In FIGS. 1 and 2, sizes in its thickness direction are enlarged to be more understandable. Touch panel 1001 includes substrate 1, substrate 2, resistance layer 3, and resistance layer 4. Substrate 1 has upper surface 1A and lower surface 1B opposite to upper surface 1A. Substrate 2 has upper surface 2A and lower surface 2B opposite to upper surface 2A. Substrates 1 and 2 are made of light-transmittable insulating film, such as polyethylene terephtharate or polycarbonate. Resistance layer 3 is provided on lower surface 1B of substrate 1 and is made of light-transmittable resistance material, such as indium tin oxide or tin oxide. Resistance layer 4 is provided on upper surface 2A of substrate 2 and is made of light-transmittable resistance material, such as indium tin oxide or tin oxide. Resistance layers 3 and 4 are formed by sputtering.

Electrodes 32A and 32B made of electrically conductive material, such as silver or carbon, are provided at both ends of resistance layer 3 in along direction 1001A, respectively. Electrodes 33A and 33B made of electrically conductive material, such as silver or carbon, are provided at both ends of resistance layer 4 in direction 1001B perpendicular to direction 1001A.

Spacer 15 has substantially a frame shape, and is made of insulating material, such as non-woven fabric or polyester film. Adhesive material, such as acrylic or rubber, is applied on upper surface 15A of spacer 15, and outer periphery 1E of substrate 1 is adhered on upper surface 16A. Similarly, adhesive material, such as acrylic or rubber, is applied on lower surface 15B of spacer 15, and outer periphery 2E of substrate 2 is adhered on lower surface 15B. Lower surface 3B of resistance layer 3 faces upper surface 4A of resistance layer 4 by a predetermined gap between the surfaces. Plural dot spacers 31 made of insulating resin, such as epoxy or silicone, are formed on upper surface 4A of resistance layer 4 at predetermined intervals.

Sheet 16 is made of light-transmittable film, such as polyethylene terephtharate or polycarbonate, and has upper surface 16A and lower surface 16B opposite to upper surface 16A. Adhesive agent, such as acrylic, having a strong adhesion property is applied onto upper surface 16A, thus providing adhesive layer 17A. Sheet 16 is attached onto lower surface 2B of substrate 2 with adhesive layer 17A. Adhesive agent, such as silicone rubber, having a weak adhesion property is applied onto lower surface 16B of sheet 16, thus providing adhesive layer 17B. Removable sheet 18 made of thin film, such as paper or polyester film, is attached onto adhesive layer 17B having the adhesive property weaker than that of adhesive layer 17A.

As shown in FIG. 1B, removable sheet 18 is peeled off, and adhesive layer 17B on lower surface 16B of sheet 16 is attached onto display surface 101A of display element 101, such as a liquid crystal display (LCD), thus providing input device 2001.

A portion of spacer 15 is cut out to form opening 15C which allows inside 15D of the frame shape to communicate with outside 15E of the frame shape. Sheet 16 has tab 16C protruding outward, and tab 16C is bent upward, so that tab 16 covers and closes opening 15C of spacer 15. Tip 16D of tab 16C is attached onto upper surface 1A of substrate 1 with adhesive layer 17A having the strong adhesion property.

Figure 3A:
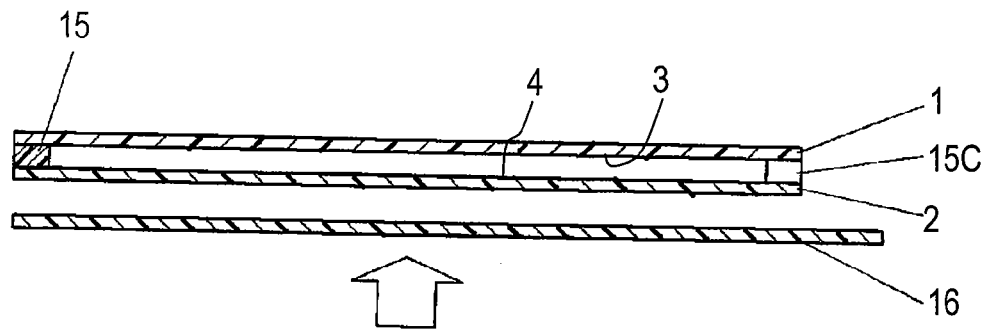
FIGS. 3A to 3C are exploded sectional views of the touch panel for illustrating a method of manufacturing the touch panel in accordance with Embodiment 1.
Figure 3B:
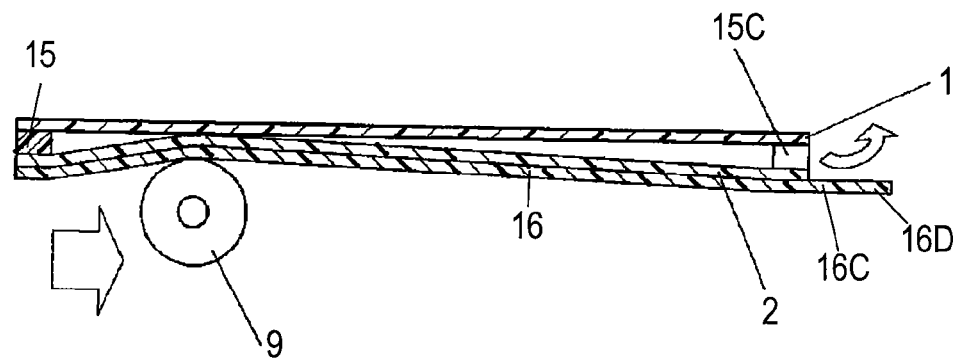
Figure 3C:
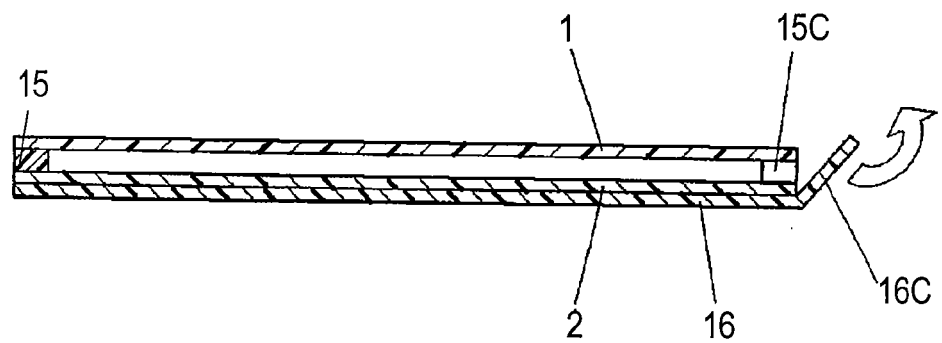
Figure 12A:
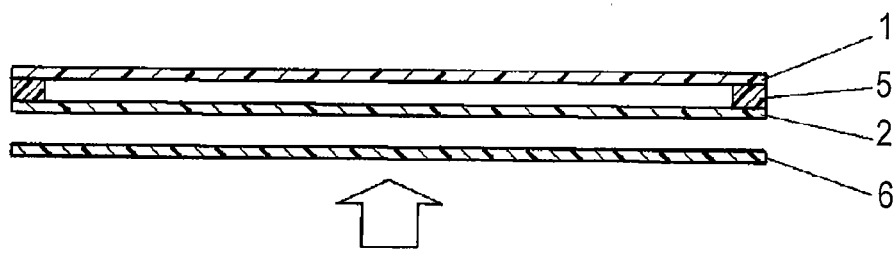
FIGS. 12A to 12C are exploded sectional views of the conventional touch panel for illustrating a conventional method of manufacturing the touch panel.
Figure 12B:
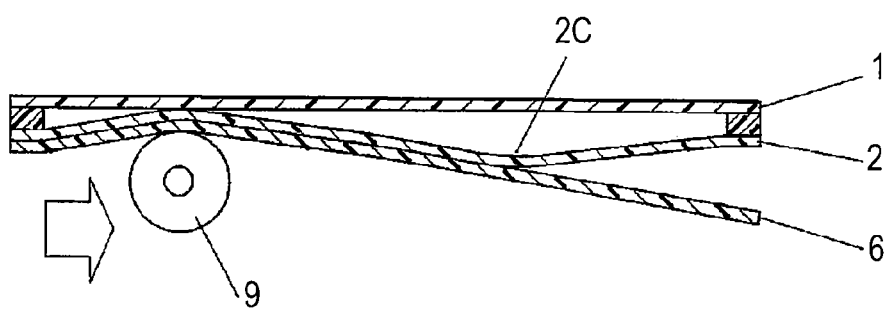
Figure 12C:
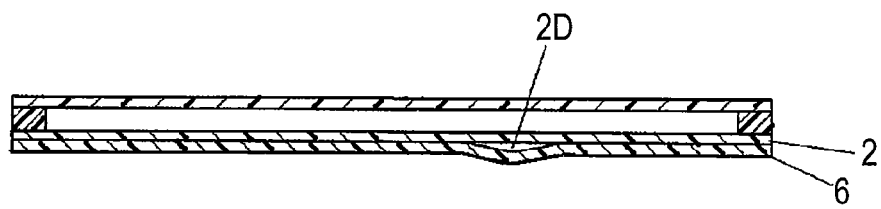

FIGS. 3A to 3C are exploded sectional views of touch panel 1001 for illustrating a method of manufacturing the touch panel in accordance with Embodiment 1. As shown in FIG. 3A, substrate 1 is attached onto upper surface 15A of spacer 15, and substrate 2 is attached onto lower surface 15B of spacer 15. Then, sheet 16 is attached onto lower surface 2B of substrate 2 with adhesive layer 17A. At this moment, as shown in FIG. 3B, roller 9 presses sheet 16 onto substrate 2 toward substrate 1. Roller 9 presses a portion of substrate 2 and causes substrate 2 to sag upward, namely, toward substrate 1, thus compresses air between substrates 1 and 2. The air can enter and exhaust through opening 15C provided in spacer 15. Substrate 2 does not expand downward, thus not producing a swell (swell 2C shown in FIG. 12A). This prevents an air bubble (air bubble 2D shown in FIG. 12C) from being produced due to the swell of substrate 2. In other words, even if roller 9 presses the substrate rather strongly or moves rather fast, no air bubble is produced between lower surface 2B of substrate 2 and sheet 16. This allows sheet 16 to be attached onto substrate 2 while producing no air bubble which reduces visibility of display element 101.

Then, as shown in FIG. 3C, tab 16C of sheet 16 is bent upward as to covering opening 15C of spacer 15. Tip 16D of tab 16C is further bent and is attached onto upper surface 1A of substrate 1 with adhesive layer 17A, thus providing touch panel 1001 shown in FIG. 1.

Touch panel 1001 in accordance with Embodiment 1 includes spacer 1 which has substantially the frame shape and has opening 15C therein, and spacer 15 couples substrate 1 to substrate 2. When sheet 16 is attached onto lower surface 2B of substrate 2, the air can enter and exhaust through opening 15C as to prevent substrate 2 from swelling, thereby allowing sheet 16 to be attached onto substrate 2 without air bubbles. After sheet 16 is attached onto substrate 2, opening 15C is closed with tab 16C, thereby preventing dust and moisture from entering into a space between substrates 1 and 2. As a result, an operator activates touch panel 1001 stably. Adhesive layer 17B and removable sheet 18 may have tabs protruding outward.

Removable sheet 18 is peeled off, and then, lower surface 16B of sheet 16 of touch panel 1001 is attached onto display element 101, thus allowing touch panel 1001 to be mounted to an electronic device. Electrodes 32A, 32B, 33A, and 33B are connected to an electronic circuit of the electronic device.

While looking at display of display screen 101A of display element 101 through touch panel 1001, an operator presses upper surface 1A of substrate 1 with a finger or a pen to cause substrate 1 to sag, accordingly causing resistance layer 3 to contact resistance layer 4 at a pressed portion of the substrate. The electronic circuit applies a voltage between electrodes 32A and 32B, and detects a voltage of electrode 33A or electrode 33B. The electronic circuit calculates the pressed position along direction 1001A based on the detected voltage. Then, the circuit applies a voltage between electrodes 33A and 33B, and detects a voltage of electrode 32A or 32B. The circuit calculates the pressed position along direction 1001B based on the detected voltage. Thus, the circuit calculates the respective positions of the pressed portion in directions 1001A and 1001B, so that the electronic circuit switches various functions of the electronic device in response to the calculated position.

Touch panel 1001 may be attached onto display element 101 with misalignment due to a positional deviation. In touch panel 1001, adhesive layer 17A on upper surface 16A of sheet 16 has the strong adhesion property, and adhesive layer 17B on lower surface 16B has the adhesion property weaker than that of adhesive layer 17A. When touch panel 1001 is removed from display element 101 just after being attached onto display element 101, sheet 16 is not removed from substrate 2, so that touch panel 1001 can be mounted onto display element 101 again.

Figure 4:
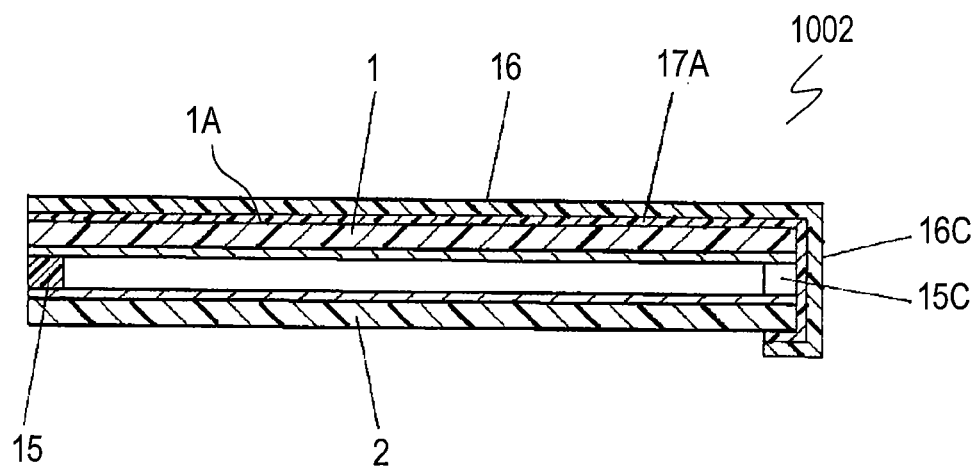
FIG. 4 is a sectional view of another touch panel in accordance with Embodiment 1.

FIG. 4 is a sectional view of another touch panel 1002 in accordance with Embodiment 1. In FIG. 4, components similar to those of touch panel 1001 shown in FIG. 1 are denoted by the same reference numerals, and their descriptions are omitted. Sheet 16 is attached onto upper surface 1A of substrate 1 with adhesive layer 17A. Sheet 16A protects upper surface 1A serving as an operating surface. Sheet 16 of touch panel 1002 has tab 16C, and tab 16C is bent downward as to cover and close opening 15C of spacer 15.

Figure 5:
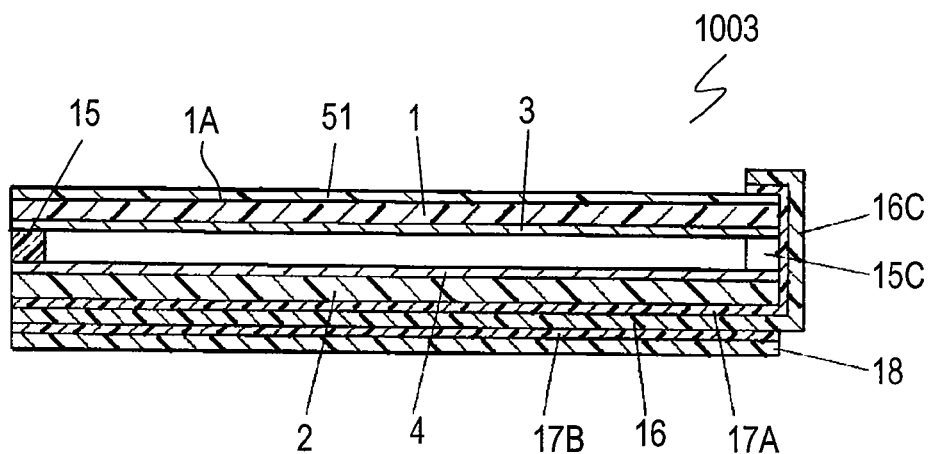
FIG. 5 is a sectional view of still another touch panel in accordance with Embodiment 1.

FIG. 5 is a sectional view of still another touch panel 1003 in accordance with Embodiment 1. In FIG. 5, components similar to those of touch panel 1001 shown in FIG. 1 are denoted by the same reference numerals, and their descriptions are omitted. Touch panel 1003 further includes polarizing plate 51 on upper surface 1A of substrate 1. Polarizing plate 51 includes a layer of polyvinyl alcohol and layers of triacetyl cellulose on both surfaces of the layer of polyvinyl alcohol. The layer of polyvinyl alcohol is formed by adsorbing iodine and dye and then drawing and providing the layer with orientation. Polarizing plate 51 has a linear polarization property.

Figure 6:
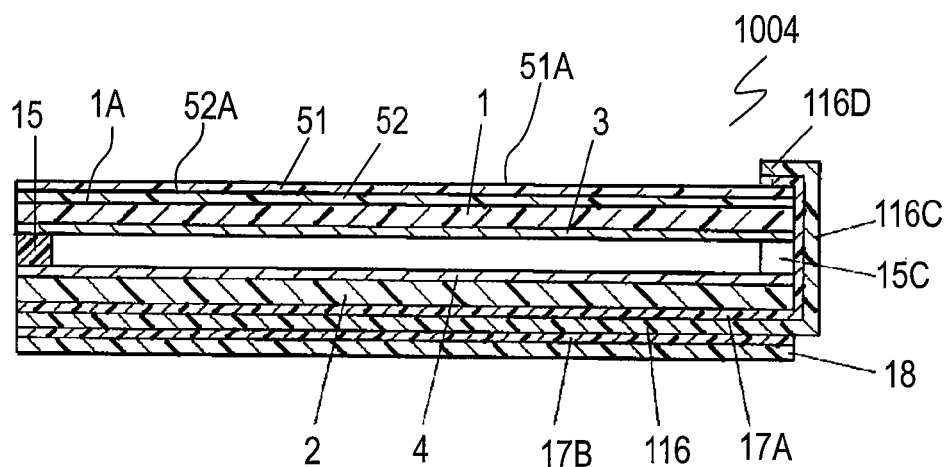
FIG. 6 is a sectional view of a further touch panel in accordance with Embodiment 1.

FIG. 6 is a sectional view of a further touch panel 1004 in accordance with Embodiment 1. In FIG. 6, components similar to those of touch panel 1003 shown in FIG. 5 are denoted by the same reference numerals, and their descriptions are omitted. Touch panel 1004 further includes phase shifter plate 52 placed between polarizing plate 51 and substrate 1. Phase shifter plate 52 is provided on upper surface 1A of substrate 1, and polarizing plate 51 is provided on upper surface 52A of phase shifter plate 52. Phase shifter plate 52 is made of polycarbonate or cyclo-olefin polymer film being drawn and having a birefringence property. Phase shifter plate 52 produces a phase shifting by a ¼ wavelength. Touch panel 1004 includes sheet 116 instead of sheet 16 shown in FIG. 5. Sheet 116 has a shape similar to that of sheet 16, and is made of material identical to that of phase shifter plate 52. Sheet 116 and phase shifter plate 52 together function as a circularly-polarizing plate. Sheet 116 has tab 116C protruding outward similarly to sheet 16 shown in FIG. 5. Tab 116C is bent upward to cover and close opening 15C of spacer 15. Tip 116D of tab 116C is attached onto upper surface 51A of polarizing plate 51.

Figure 7:
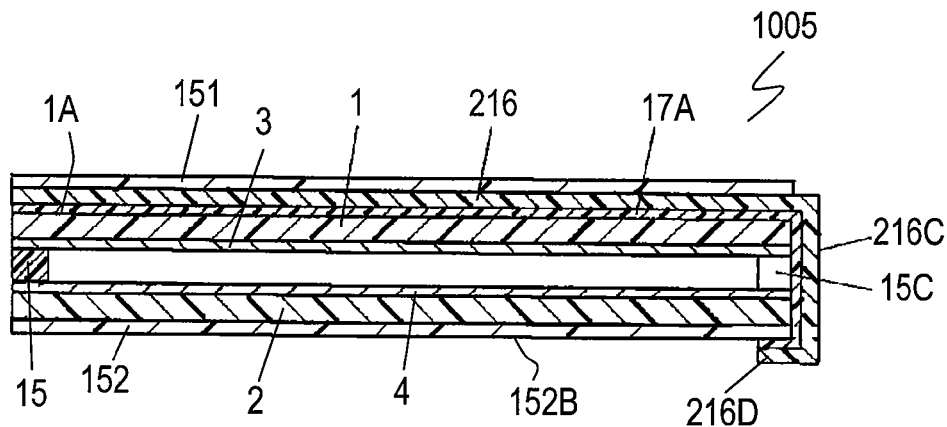
FIG. 7 is a sectional view of a further touch panel in accordance with Exemplart Embodiment 1.

FIG. 7 shows a sectional view of further touch panel 1005 in accordance with Embodiment 1. In FIG. 7, components similar to those of touch panel 1002 shown in FIG. 4 are denoted by the same reference numerals, and their descriptions are omitted. Touch panel 1005 further includes phase shifter plate 152 provided on lower surface 2B of substrate 2. Plate 152 is made of polycarbonate or cyclo-olefin polymer film being drawn and having a birefringence property. Phase shifter plate 52 produces a phase shifting by a ¼ wavelength. Touch panel 1005 includes sheet 216 instead of sheet 16 of touch panel 1002 shown in FIG. 4. Sheet 216 has a shape similar to that of sheet 16, and is made of material identical to that of phase shifter plate 152. Touch panel 1005 further includes polarizing plate 151 provided on upper surface 216A of sheet 216. Polarizing plate 151 includes a layer of polyvinyl alcohol and layers of triacetyl cellulose on both surfaces of the layer of polyvinyl alcohol. The layer of polyvinyl alcohol is formed by adsorbing iodine and dye and then drawing and providing the layer with orientation. Polarizing plate 51 has a linear polarization property. Sheet 216 and phase shifter plate 152 together function as a circularly-polarizing plate. Sheet 216 has tab 216 C protruding outward as sheet 16 shown in FIG. 5 has. Tab 216C is bent upward to cover and close opening 15C of spacer 15. Tip 216D of tab 216C is attached onto lower surface 152B of polarizing plate 152.

Exemplary Embodiment 2

Figure 8A:
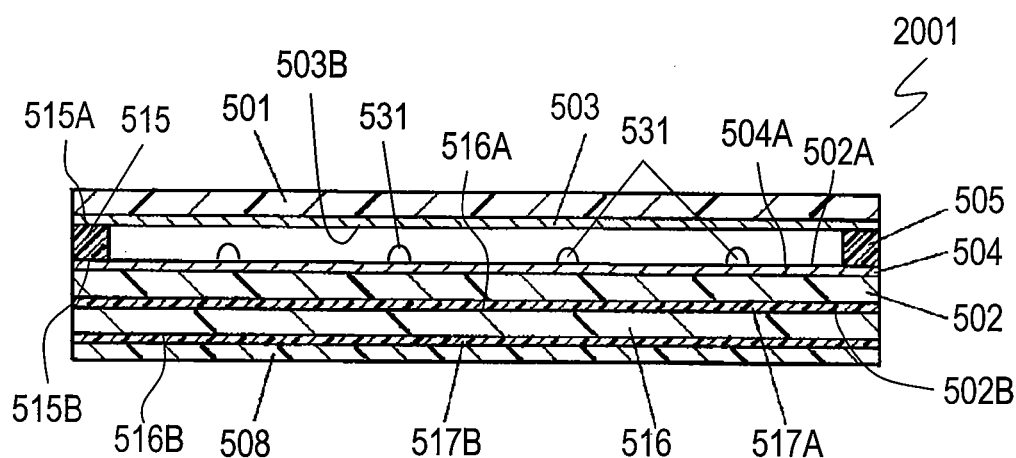
FIG. 8A is a sectional view of a touch panel in accordance with Exemplary Embodiment 2 of the invention.
Figure 8B:
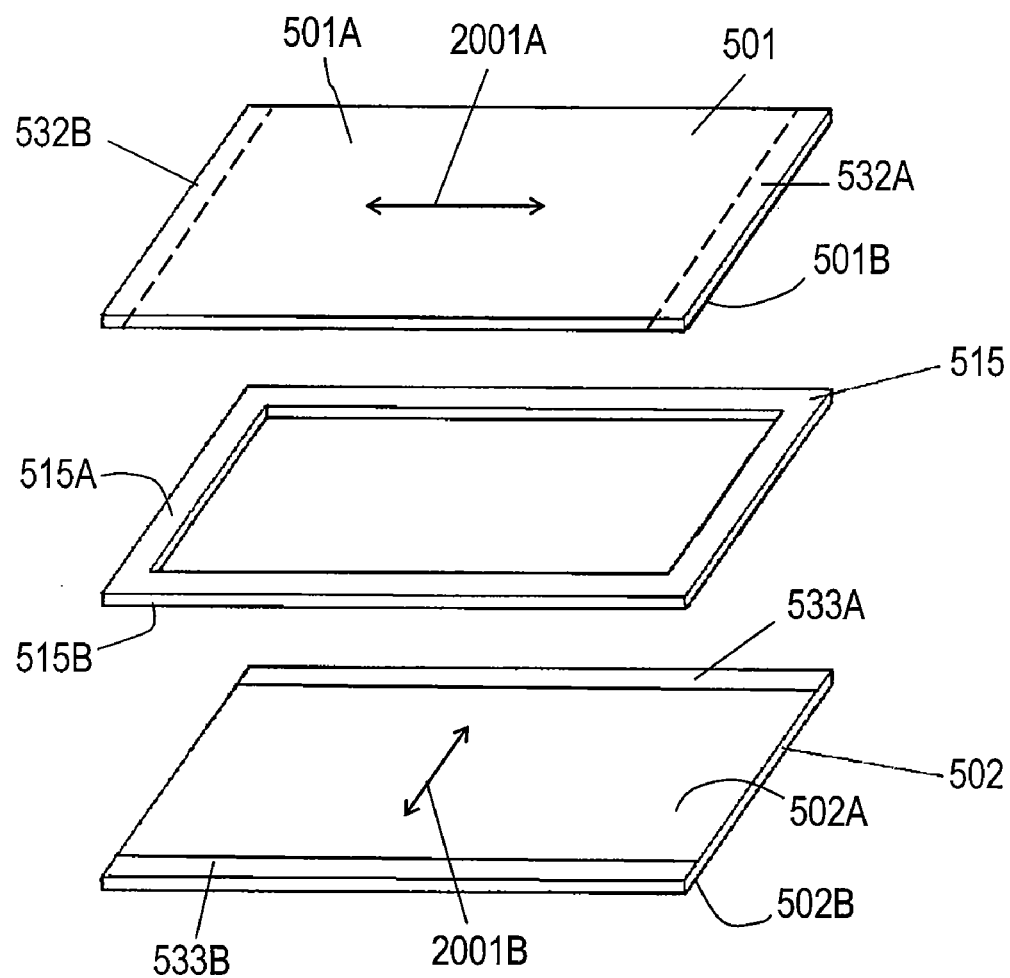

FIG. 8A is a sectional view of touch panel 2001 in accordance with Exemplary Embodiment 2 of the present invention. FIG. 8B is an exploded view of touch panel 2001. Touch panel 2001 includes substrate 501, substrate 502, resistance layer 503, and resistance layer 504. Substrate 501 has upper surface 501A and lower surface 501B opposite to upper surface 501A. Substrate 502 has upper surface 502A and lower surface 502B opposite to upper surface 502A. Substrate 501 is made of light-transmittable insulating film, such as polyethylene terephtharate or polycarbonate. Substrate 502 is made of light-transmittable insulating material, such as glass, acrylic, or polycarbonate. Resistance layer 503 is provided on lower surface 501B of substrate 501 and is made of light-transmittable resistance material, such as indium tin oxide or tin oxide. Resistance layer 4 is provided on upper surface 502A of substrate 502, and is made of light-transmittable resistance material, such as indium tin oxide or tin oxide. Resistance layers 503 and 504 are formed by sputtering.

Electrodes 532A and 532B made of electrically conductive material, such as silver or carbon, are provided at both ends of resistance layer 503 along direction 2001A. Electrodes 533A and 533B made of electrically conductive material, such as silver or carbon, are provided at both ends of resistance layer 504 along direction 2001B perpendicular to direction 2001A.

Spacer 515 has substantially a frame shape and is made of insulating material, such as non-woven fabric or polyester film. Adhesive material, such as acrylic or rubber, is applied onto upper surface 515A of spacer 515, and an outer periphery of substrate 501 is attached onto upper surface 515A. Similarly, adhesive material, such as acrylic or rubber, is applied onto lower surface 515B of spacer 515, and an outer periphery of substrate 502 is attached onto lower surface 515B. Lower surface 503B of resistance layer 503 faces upper surface 504A of resistance layer 504 by a predetermined gap between the surfaces. Plural dot spacers 531 made of insulating resin, such as epoxy or silicone, are provided on upper surface 504A of resistance layer 504 at predetermined intervals.

Light-transmittable sheet 516 is made of film, such as polyethylene terephtharate or polycarbonate film, and has upper surface 516A and lower surface 516B opposite to upper surface 516A. Strong adhesive layer 517A, such as acrylic, having a strong adhesion property having an adhesive strength to glass ranging from 0.1 N/cm to 20 N/cm, is formed on upper surface 516A of sheet 516. Sheet 516 is thus attached onto lower surface 502B of substrate 502 with strong adhesive layer 517A having the strong adhesion property.

Weak adhesive layer 517B, such as olefin-based material or styrene-based material, having a weak adhesion having an adhesive strength to glass ranging from 0.01 N/cm to 0.5 N/cm is formed on lower surface 516B of sheet 516. Removable sheet 508 made of flexible sheet, such as paper or film, is attached onto weak adhesive layer 517B. That is, an adhesion property of weak adhesive layer 517B is determined to be weaker than that of strong adhesive layer 517A.

Figure 9:
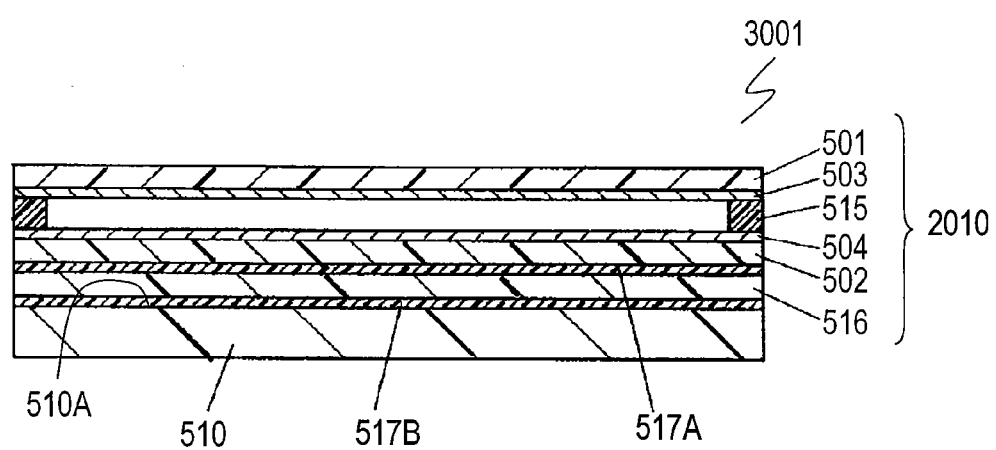
FIG. 9 is an exploded perspective view of the touch panel in accordance with Embodiment 2.

FIG. 9 is a sectional view of input device 3001 in accordance with Embodiment 2. Removable sheet 508 of touch panel 2001 is peeled off, and then weak adhesive layer 517B is attached onto display screen 510A of display element 510, such as an LCD. Electrodes 532A, 532B, 533A, and 533B are connected to an electronic circuit of an electronic device, and thus, input device 3001 is mounted to the electronic device.

While looking at a display on display screen 510A of display element 510 through touch panel 2001, an operator presses upper surface 501A of substrate 501 with a finger or a pen to cause substrate 501 sag, thereby causing resistance layer 503 to contact resistance layer 504 at a pressed portion. The electronic circuit applies a voltage between electrodes 532A and 532B, and detects a voltage via electrode 533A or electrode 533B. The electronic circuit calculates the position of the pressed portion along direction 2001A based on the detected voltage. Then, the circuit applies a voltage between electrodes 533A and 533B, and detects a voltage via electrode 532A or 532B. The circuit calculates the position of the pressed portion along direction 2001B based on the detected voltage. As a result, the circuit calculates the respective positions of the pressed portion in directions 2001A and 2001B, so that the electronic circuit switches various functions of the electronic device in response to the calculated position.

Touch panel 2001 may be mounted to display element 510 with misalignment due to a positional deviation. Lower surface 516B of sheet 516 has weak adhesive layer 517B having the weak adhesion property, and touch panel 2001 is attached onto display element 510 with weak adhesive layer 517B. This arrangement allows touch panel 2001 to be removed from display element 510 easily and attached onto display element 510 again.

Sheet 516 is bonded to substrate 502 with strong adhesive layer 517A having a strong adhesion property, and sheet 516 is bonded to display element 510 with weak adhesive layer 517B having the adhesion property weaker than that of strong adhesive layer 517A. When touch panel 2001 is removed from display element 510, sheet 516 keeps adhering to substrate 502 and removes from display element 510. Therefore, after touch panel 2001 is removed, sheet 516 is not necessarily peeled off from display element 510.

Weak adhesive layer 517B has a weak adhesive property to glass ranging from 0.01 N/cm to 0.5 N/cm, and is applied on lower surface 516B of sheet 516, hence being neither transcribed nor attached onto display element 510. After sheet 516 is peeled off, it is not necessary to remove weak adhesive layer 517B since weak adhesive layer 517B does not remain on display element 510.

Weak adhesive layer 517B may be made of single material, such as silicone rubber or urethane rubber. According to Embodiment 2, weak adhesive layer 517B is made of thermoplastic elastomer, such as olefin-based material, styrene-based material, ester-based material, or polyvinyl chloride-based material, and hence having its adhesive property adjusted easily.

Weak adhesive layer 517B contains soft segment and hard segment which has an adhesive property stronger than that of the soft segment. Weak adhesive layer 517B made of the olefin-based thermoplastic elastomer contains ethylene propylene as the hard segment and polyethylene polypropylene as the soft segment. Weak adhesive layer 517B made of the styrene thermoplastic elastomer contains polybutadiene as the hard segment and polystyrene as the soft segment. Weak adhesive layer 517B made of the urethane-based thermoplastic elastomer contains polyester-polyether as the hard segment and polyurethane as the soft segment. Weak adhesive layer 517B made of the ester-based thermoplastic elastomer contains polyether-polyester as the hard segment and polyester as the soft segment. Weak adhesive layer 517B made of the polyvinyl chloride-based thermoplastic elastomer contains noncrystalline polyvinyl chloride as the hard segment and crystalline polyvinyl chloride as the soft segment.

Weak adhesive layer 517B contains the segments of thermoplastic elastomer having adhesive properties different from each other. The adhesive property of weak adhesive layer 517B is adjusted easily depending on the mixture ratio of these segments. Thus, the adhesive property of weak adhesive layer 517B may be adjusted according to the adhesive property of strong adhesive layer 517A so as to allow touch panel 2001 to be peeled off from display element 510.

Strong adhesive layer 517A is made of material having an adhesion property ranging preferably from 1 N/cm to 10 N/cm as to have the adhesion property stronger than that of adhesion layer 517B in order to allow layer 517B having the weak adhesion property to remove from display element 1001 whenever touch panel 2001 is removed from display element 510.

Exemplary Embodiment 3

Figure 10A:
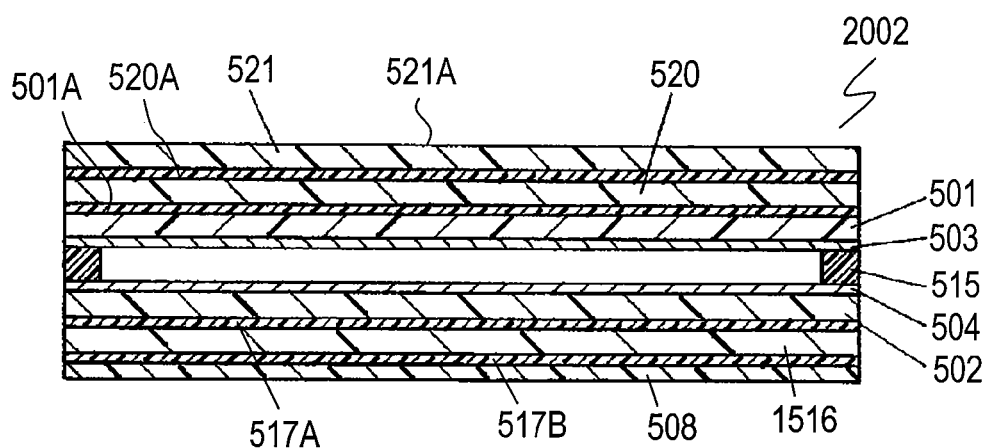
FIG. 10A is a sectional view of a touch panel in accordance with Embodiment 3 of the invention.
Figure 10B:
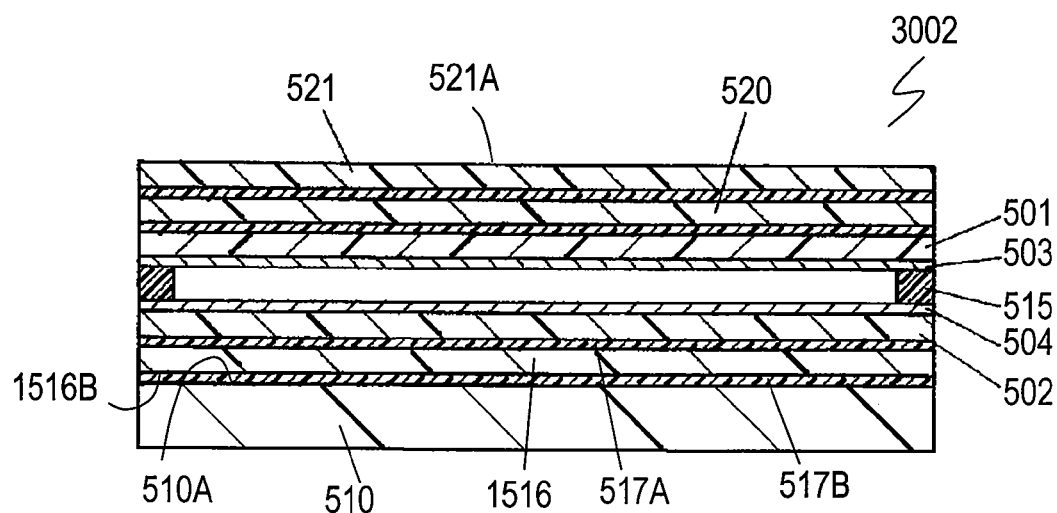
FIG. 10B is a sectional view of an input device in accordance with Embodiment 3.
Figure 11:
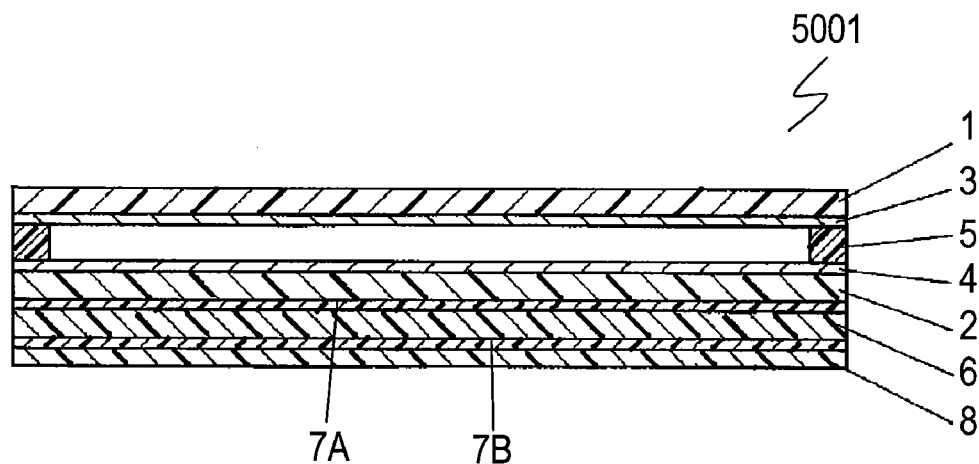
FIG. 11 is a sectional view of a conventional touch panel.

FIG. 10A is a sectional view of touch panel 2002 in accordance with Exemplary Embodiment 3 of the present invention. FIG. 10B is a sectional view of input device 3002 in accordance with Embodiment 3. In FIGS. 10A and 10B, components similar to those of touch panel 2001 shown in FIG. 8A and input device 3001 shown in FIG. 9 are denoted by the same reference numerals, and their descriptions are omitted.

Substrate 501 of touch panel 2002 is made of polycarbonate, polyether-sulfone. Subtrate 502 is made of polycarbonate, polyether-sulfone, or glass. Touch panel 2002 includes sheet 1516 instead of sheet 516 of touch panel 2001. Sheet 1516 is made of polycarbonate or cyclo-olefin polymer film being drawn and having a birefringence property. Sheet 1516 produces a phase shifting by a ¼ wavelength.

Phase shifter plate 520 made of material identical to that of sheet 1516 is provided on upper surface 501A of substrate 501. Polarizing plate 521 is provided on upper surface 520A of plate 520. Polarizing plate 521 includes a layer of polyvinyl alcohol and layers of triacetyl cellulose on both surfaces of the layer of polyvinyl alcohol. The layer of polyvinyl alcohol is formed by adsorbing iodine and dye and then drawing and providing the layer with orientation. Sheet 1516 and phase shifter plate 520 provides touch panel 2002 of a circularly polarizing type.

An operator looks at display element 510 attached onto lower surface 1516B of sheet 1516 through touch panel 2002 from above upper surface 521A of polarizing plate 521, similarly to touch panel 2001. When external light, such as sunlight or lamplight, entering from above polarizing plate 521 transmits via polarizing plate 521, polarizing plate 521 absorbs light, for example polarized in a Y-direction out of an X-direction and the Y-direction crossing perpendicularly to the X-direction. The external light passing through plate 521 becomes light linearly polarized in the X-direction, and enters to phase shifter plate 520.

Then, this light passes through phase shifter plate 520 of a ¼ wavelength to have a polarizing surface of the light rotated by 45 degrees, and then passes through substrate 510, resistance layer 503, and reflects on resistance layer 504 upwardly toward polarizing plate 521.

The reflected light passes through plate 520 of ¼ wavelength again to have the polarizing surface rotated by 45 degrees, and thus, the light entering into polarizing plate 520 is shifted in its phase by a ½ wavelength, namely, the light has the polarizing surface rotated by 90 degrees. This light comes out from plate 520 again and enters to polarizing plate 521 which transmits light only in the X-direction, so that the light coming out from phase shifter plate 520 is cut off and cannot come out from upper surface 521A.

Thus, the external light enters from above upper surface 521A of polarizing plate 521 is reflected on resistance layer 504 upwardly. However, this reflected light is cut off by polarizing plate 521, so that this light cannot come out from upper surface 521A. This operation allows touch panel 2002 to be read easily, to have an excellent visibility, and to have no reflection.

In the case that display element 510 employs the LCD, the light coming out from display element 510 is polarized in a predetermined direction. Input device 3002 is placed to allow display element 510 to output light linearly polarized in the Y-direction. The light from display element 510 firstly transmits through sheet 1516 providing the phase shifting of a ¼ wavelength and phase shifter plate 520 providing the phase shifting of ¼ wavelength, so that the light becomes light linearly polarized shifted in phase by ½ wavelength. Since polarizing plate 521 transmits light polarized only in the X-direction, the light coming out from display element 510 and passing through sheet 1516 and phase shifter plate 520 can pass through polarizing plate 521, and comes out from upper surface 521A. Thus an operator can clearly reads a display on display element 510.

Weak adhesive layer 517B having the weak adhesion property provided on lower surface 1516A of sheet 1516 allows touch panel 2002 to be removed from display element 510 easily, and prevents weak adhesive layer 517B from remaining on an upper surface of display element 510. Thus, touch panel 2002 removed from display element 510 can be mounted onto display element 510 again easily.

According to Embodiment 3, sheet 1516 attached onto lower surface 502B of substrate 502 employs the phase shifter plate providing the phase shift of ¼ wavelength provides touch panel 2002 input device 3002 with touch panel 2002 including a small number of components, having an excellent visibility, and allowing the display element to be easily.

What is claimed is:

1. A touch panel comprising:
    a first substrate being light-transmittable and having a first surface and a second surface opposite to the first surface, the first substrate having a first outer periphery;
    a first resistance layer being light-transmittable and provided on the first surface of the first substrate;
    a second substrate being light-transmittable and having a third surface and a fourth surface opposite to the third surface, the second substrate having a second outer periphery;
    a second resistance layer being light-transmittable provided on the third surface of the second substrate, the second resistance layer facing the first resistance layer by a predetermined gap between the second resistance layer and the first resistance layer;
    a spacer having substantially a frame shape provided between the first outer periphery of the first substrate and the second outer periphery of the second substrate;
    a first adhesive layer provided on the fourth surface of the second substrate, the first adhesive layer having an adhesion property;
    a sheet being light-transmittable and having a fifth surface and a sixth surface opposite to the fifth surface, the fifth surface of the sheet being attached onto the first adhesive layer; and
    a second adhesive layer provided on the sixth surface of the sheet, the second adhesive layer having an adhesion property weaker than the adhesion property of the first adhesive layer.

2. The touch panel of claim 1, wherein the sheet produces a phase shifting by a ¼ wavelength.

3. The touch panel of claim 1, wherein the second adhesive layer comprises thermoplastic elastomer.

4. The touch panel of claim 1, wherein the spacer has an opening provided therein, and wherein the sheet covers the opening of the spacer.

5. The touch panel of claim 1, wherein the sheet includes a tab protruding therefrom, and the tab covers the opening of the spacer.

6. An input device comprising:
    a first substrate being light-transmittable and having a first surface and a second surface opposite to the first surface, the first substrate having a first outer periphery;
    a first resistance layer being light-transmittable and provided on the first surface of the first substrate;
    a second substrate being light-transmittable and having a third surface and a fourth surface opposite to the third surface, the second substrate having a second outer periphery;
    a second resistance layer being light-transmittable provided on the third surface of the second substrate, the second resistance layer facing the first resistance layer by a predetermined gap between the second resistance layer and the first resistance layer;
    a spacer having substantially a frame shape provided between the first outer periphery of the first substrate and the second outer periphery of the second substrate;
    a first adhesive layer provided on the fourth surface of the second substrate, the first adhesive layer having an adhesion property;

a sheet being light-transmittable and having a fifth surface and a sixth surface opposite to the fifth surface, the fifth surface of the sheet being attached onto the first adhesive layer;

a second adhesive layer provided on the sixth surface of the sheet, the second adhesive layer having an adhesion property weaker than the adhesion property of the first adhesive layer; and a display element attached onto the second adhesive layer.

7. The touch panel according to claim 6, wherein the second adhesive layer comprises thermoplastic elastomer.

8. A touch panel comprising:

a first substrate having a first surface and a second surface opposite to the first surface, the first substrate having a first outer periphery;

a first resistance layer provided on the first surface of the first substrate;

a second substrate having a third surface and a fourth surface opposite to the third surface, the second substrate having a second outer periphery;

a second resistance layer provided on the third surface of the second substrate, the second resistance layer facing the first resistance layer by a predetermined gap between the second resistance layer and the first resistance layer;

a spacer having substantially a frame shape provided between the first outer periphery of the first substrate and the second outer periphery of the second substrate, the spacer having an opening provided therein; and a sheet provided on the fourth surface of the second substrate, the sheet covering the opening of the spacer.

9. The touch panel of claim 8, wherein the sheet includes a tab protruding therefrom, and the tab covers the opening of the spacer.

10. The touch panel of claim 8, wherein the sheet has a fifth surface and a sixth surface opposite to the fifth surface, the fifth surface of the sheet facing the fourth surface of the second substrate, said touch panel further comprising:

a first adhesive layer having an adhesion property attaching the fifth surface of the sheet onto the fourth surface of the second substrate; and a second adhesive layer provided on the sixth surface of the sheet, the second adhesive layer having an adhesion property weaker than the adhesion property of the first adhesive layer.

11. A method of manufacturing a touch panel, comprising:

providing a first substrate, a first resistance layer, a second substrate, a second resistance layer, and a spacer, wherein the first substrate has a first surface and a second surface opposite to the first surface, the first substrate having a first outer periphery, the first resistance layer is provided on the first surface of the first substrate, the second substrate has a third surface and a fourth surface opposite to the third surface, the second substrate having a second outer periphery, the second resistance layer is provided on the third surface of the second substrate, the second resistance layer facing the first resistance layer by a predetermined gap between the second resistance layer and the first resistance layer, and the spacer has substantially a frame shape provided between the first outer periphery of the first substrate and the second outer periphery of the second substrate, the spacer having an opening provided therein;

after said providing the first substrate, the first resistance layer, the second substrate, the second resistance layer, and the spacer, providing a sheet on the fourth surface of the second substrate; and after providing the sheet, covering the opening of the spacer with the sheet.

12. The method of claim 11, wherein said providing the sheet comprises pressing the sheet onto the fourth surface of the second substrate.

13. The method of claim 11, wherein the sheet includes a tab protruding therefrom, and wherein said covering the opening of the spacer with the sheet comprises:

bending the tab; and covering the opening of the sheet with the bent tab.

14. The method of claim 11, wherein said covering the opening of the spacer with the sheet comprises:

bending a portion of the sheet; and covering the opening of the spacer with the bent portion of the sheet.

* * * * *